United States Patent [19]

Mudd et al.

[11] Patent Number: 5,321,992

[45] Date of Patent: Jun. 21, 1994

[54] MEASUREMENT OF GAS FLOWS WITH ENHANCED ACCURACY

[75] Inventors: Daniel T. Mudd, Long Beach; Daniel A. Vreeland, Redondo Beach, both of Calif.

[73] Assignee: DXL USA, Torrance, Calif.

[21] Appl. No.: 766,058

[22] Filed: Sep. 26, 1991

[51] Int. Cl.⁵ ............................................... G01F 1/00
[52] U.S. Cl. ......................................... 73/861.77; 73/3
[58] Field of Search .................... 73/3, 861.01, 861.77, 73/861.78; 364/571.04, 571.05, 571.07, 510

[56] References Cited

U.S. PATENT DOCUMENTS

| | | | |
|---|---|---|---|
| 4,581,946 | 4/1986 | Kanayama | 364/510 |
| 4,885,943 | 12/1989 | Tootell et al. | 73/861.77 |
| 4,961,348 | 10/1990 | Bonne | 73/861.02 |
| 5,016,187 | 5/1991 | Forkert et al. | 364/510 |

OTHER PUBLICATIONS

Written Opinion; PCT Authorities; Aug. 30, 1993.

*Primary Examiner*—Richard E. Chilcot, Jr.
*Assistant Examiner*—R. Biegel
*Attorney, Agent, or Firm*—Spensley Horn Jubas & Lubitz

[57] ABSTRACT

A method of correcting measurement errors of an instrument for measuring the flow of a gas, the instrument having a selected measuring range and being constructed to produce a reading indicating the value of a gas flow in the selected measuring range, by the steps of: selecting a limited number of gas flow values which are spaced apart across the measuring range; determining the readings produced by the instrument when the instrument is measuring gas flows at the selected values; measuring the flow of the gas with the instrument to produce a reading indicating the value of the gas flow; and producing a corrected reading by calculating a function of the reading produced in the measuring step and the readings produced in the determining step.

9 Claims, 2 Drawing Sheets

MEASUREMENT OF GAS FLOWS WITH ENHANCED ACCURACY

BACKGROUND OF THE INVENTION

The present invention relates to the measurement of gas flows in industrial processes, particularly processes requiring accurate control of gas flows at rates corresponding to those employed in integrated circuit manufacture.

Accurate control of the mass or volume flow of gasses is essential to many manufacturing operations. During the manufacture of semiconductors and ICs, for example, there are many processing steps which require delivery into an enclosure of a precisely controlled amount of one or more gasses. Generally, the quantity of gas introduced may be controlled by controlling the time of delivery while monitoring mass flow rate. Other manufacturing operations require that the flow rate of each of one or more gasses be maintained at a selected value.

Therefore, a variety of flow meters have been developed for measuring mass flow rates of gasses from levels be 5 standard cubic centimeters per minute (SCCM) to more than $5 \times 10^5$ SCCM.

In a typical instrument, a small flow is routed through a sensor assembly where the mass flow is measured, while most of the flow is routed through a flow splitter section located in parallel with the sensor assembly. The sensor assembly contains a capillary tube with two resistance thermometers wound on the outside. The resistance thermometers form two legs of an electronic bridge; the other two legs are usually fixed resistors.

Every flow meter design currently in use has some inherent nonlinearity in its response, i.e. the output signal does not vary in a precisely linear manner with flow rate over the entire measuring range. It is already known in .the art to at least partially compensate for such nonlinearity by processing the flow meter output signal in an analog correction circuit which employs one or more variable resistors set to correct for the output signal error at one or more selected points over the flow meter measuring range. Such correction circuits are physically bulky and are difficult to adjust. Moreover, each time there is a change in the nature or composition of the gas which is being conducted through the flow meter, the resistance value of the resistor or resistors must be adjusted. In addition, variable resistors experience drift in their resistance value with time and have a relatively high failure rate.

In other measuring fields, it has been proposed to correct for measurement instrument inaccuracies by converting the measuring signal to digital form, applying the digital signal to a so-called look-up table, deriving a corrected version of the digital signal from the look-up table and then, if necessary, converting the corrected version to analog form. The look-up table is typically a digital memory whose memory addresses correspond to digital versions of respective values of the original measuring signal and whose memory contents correspond to corrected versions of the respective values of the original measuring signal.

While such a system offers the possibility of achieving near perfect measuring accuracy, creation of such a look-up table is both time consuming and costly because the number of corrected values which must be determined and programmed corresponds to the intended measurement precision of the instrument. To cite a simple example, if an instrument has a measurement range of 500 units and is to produce a measurement reading with a precision of 0.5 unit, then 1000 corrected values must be determined and stored in the look-up table.

Moreover, it is generally necessary to derive these corrected values for each individual measurement instrument to take account of variations between even instruments made in the same series.

If an instrument is used to perform measurements on a variety of substances and has a different response to each substance, a set of corrected values must be determined and stored for each substance.

Therefore, this approach to correction of inherent instrument inaccuracies is frequently unacceptable because of the substantial cost which it involves.

SUMMARY OF THE INVENTION

It is a primary object of the present invention to reduce the effort, and hence the cost, of correcting inherent measuring instrument inaccuracies.

A more specific object of the invention is to provide the above improvement for gas flow measuring instruments.

A further object of the invention is to achieve instrument error correction with the aid of a digital device which requires substantially less memory than corresponding prior art digital devices.

The above and other objects are achieved, according to the present invention, by a method of correcting measurement errors of an instrument for measuring the flow of a gas, the instrument having a selected measuring range and being constructed to produce a reading indicating the value of a gas flow in the selected measuring range, which method includes:

selecting a limited number of gas flow values which are spaced apart across the measuring range;

determining the readings produced by the instrument when the instrument is measuring gas flows at the selected values;

measuring the flow of the gas with the instrument to produce a reading indicating the value of the gas flow; and producing a corrected reading by calculating a function of the reading produced in the measuring step and the readings produced in the determining step.

In accordance with a further feature of the invention, the novel method is employed for measuring the flow of a selected one of a plurality of different gasses, one of which is a reference gas, wherein the sensor responds differently to each gas, by:

performing the step of determining in order to determine the readings produced by the instrument when the instrument is measuring flows of the reference gas at the selected values, and then calculating modified values for those readings for one of the gasses other than the reference gas;

performing the step of measuring on the one gas other than the reference gas; and employing the modified values produced in the step of determining in the function utilized in the step of producing a corrected reading.

DESCRIPTION OF THE PREFERRED EMBODIMENTS

The concept underlying the invention is that when the sensor reading values corresponding to a small number of flow rate values are known, suitable interpolation of the current value with respect to the range between the two adjacent known values produces a substantial error reduction. A significant advantage of this approach is that the calibration needed to derive the known values for a given gas and/or a given flow rate range can be performed quickly and easily, so that it becomes possible, at low cost, to significantly improve the accuracy of any instrument and to give even very inexpensive instruments acceptable accuracy for many industrial purposes.

To illustrate the invention, reference will be made to FIG. 1 which is a diagram of the relation between actual flow rate in percent of maximum measuring scale value, along the abscissa, and sensor reading, in arbitrary units, along the ordinate. Line 2 depicts a perfect sensor response, while curve 4 shows, possibly in exaggerated form, the response of a sensor which is exemplary of existing devices. It is assumed that curve 4 varies monotonically. Without error correction, the sensor reading will have substantial inaccuracies.

According to the invention, the sensor readings at selected flow rate values are determined and used as reference values for calculating a corrected sensor reading. Here, five flow rate values, at 0, 25, 50, 75 and 100% of the full measuring scale, are selected. These selected flow rate values divide the sensor measuring range into four range segments. The flow rate values are determined in a conventional manner by producing a gas flow at each of the selected values, independently controlled by a calibrated, high accuracy control system, and observing and recording the corresponding sensor readings.

Then, the sensor is installed to monitor the flow of a selected gas. The sensor reading may be processed according to the following equation:

$$\text{Present Flow Rate} = \text{Flow Rate}_i + \left( \frac{R_{act} - R_i}{R_{i+1} - R_i} \cdot \frac{1}{n} \right),$$

where:
the Flow Rates are in terms of percent of full scale,
i = selected flow rate value,
Flow Rate$_i$ is the selected flow rate associated with the reference sensor reading value which is lower than, and closest to, the present sensor reading;
$R_{act}$ is the present sensor reading value;
$R_i$ is the reference sensor reading value associated with Flow Rate$_i$;
$R_i$ is the reference sensor reading value immediately above $R_i$; and
n is the number segments into which line 2 is divided by the selected flow rate values.

In the illustrated example, n=4; in more general terms, n is equal to one less than the number of selected flow rate values when, as is preferred, a respective selected value exists at each end of the sensor measuring range. For most sensors, a substantial improvement in accuracy can be achieved if n≧3 and no significant improvement will be produced if n>10.

Figure 1:
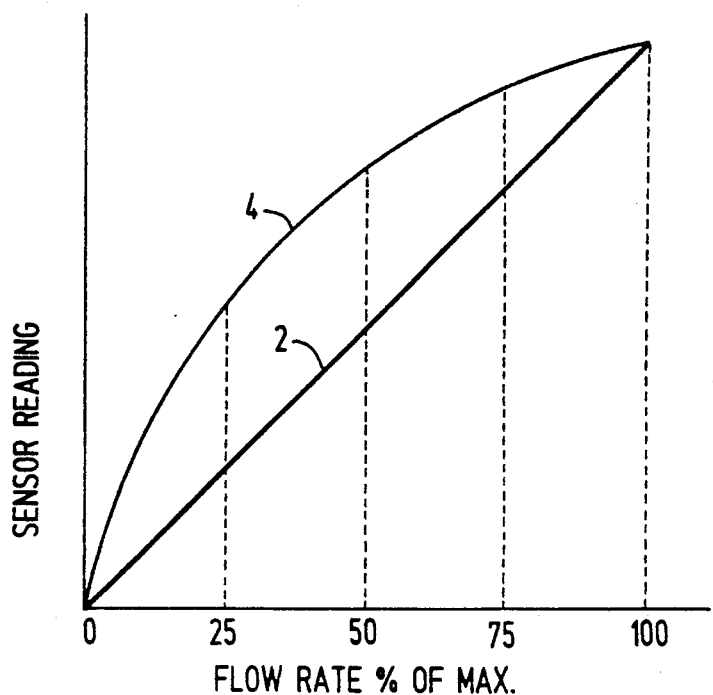
FIG. 1 is a diagram illustrating the measuring characteristic of a typical sensor which can be corrected according to the invention.
Figure 2:
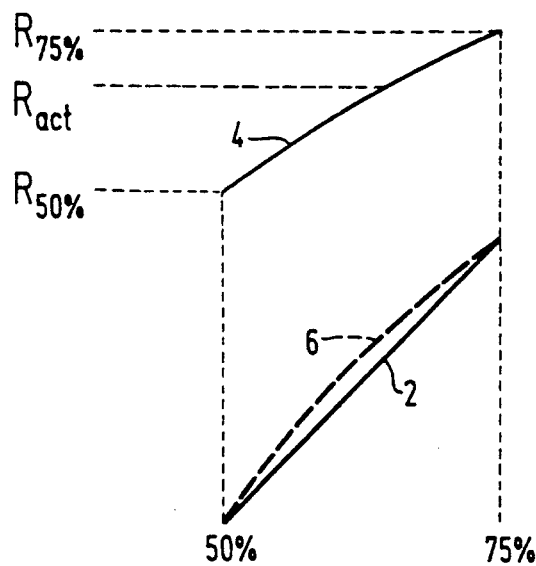
FIG. 2 is a diagram representing a portion of the diagram of FIG. 1 to an enlarged scale and illustrating the method according to the invention.

FIG. 2 shows, to an enlarged scale, the portion of FIG. 1 between flow rate values of 50% and 75%. Due to the interpolation defined in the above equation, the corrected readings derived from the readings of curve 4 lie along curve 6, from which it can be seen that the resulting reading error is significantly reduced.

Figure 3:
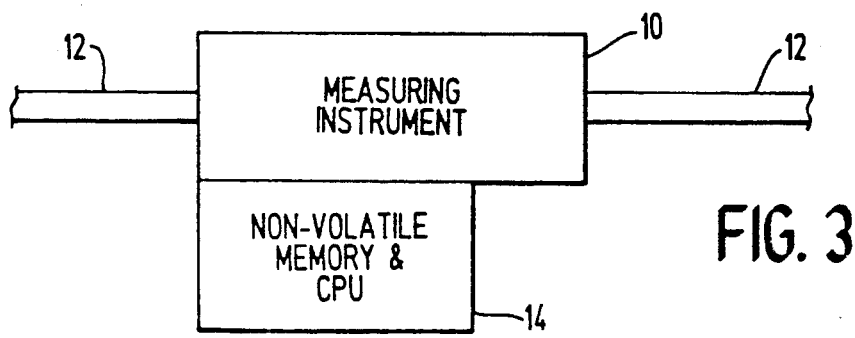
FIG. 3 is a simplified view of an instrument equipped to operate according to the invention.

An instrument assembly for implementing the invention is shown in FIG. 3. This includes a measuring instrument 10 of conventional design which includes a flow sensor and is connected in series with a pipeline 12 carrying a gas whose flow is to be measured. Instrument 10 produces a digital output or an analog output which is supplied to an analog-digital converter.

In either event, the digital output is supplied to a non-volatile memory and CPU unit 14. The non-volatile memory of unit 14 stores the reference values and associated selected flow rate values while the CPU operates according to a stored program to produce the corrected reading in accordance with the above equation. The corrected reading is then stored and/or displayed in a desired form and/or is used to adjust the gas flow rate in pipeline 12.

Figure 4:
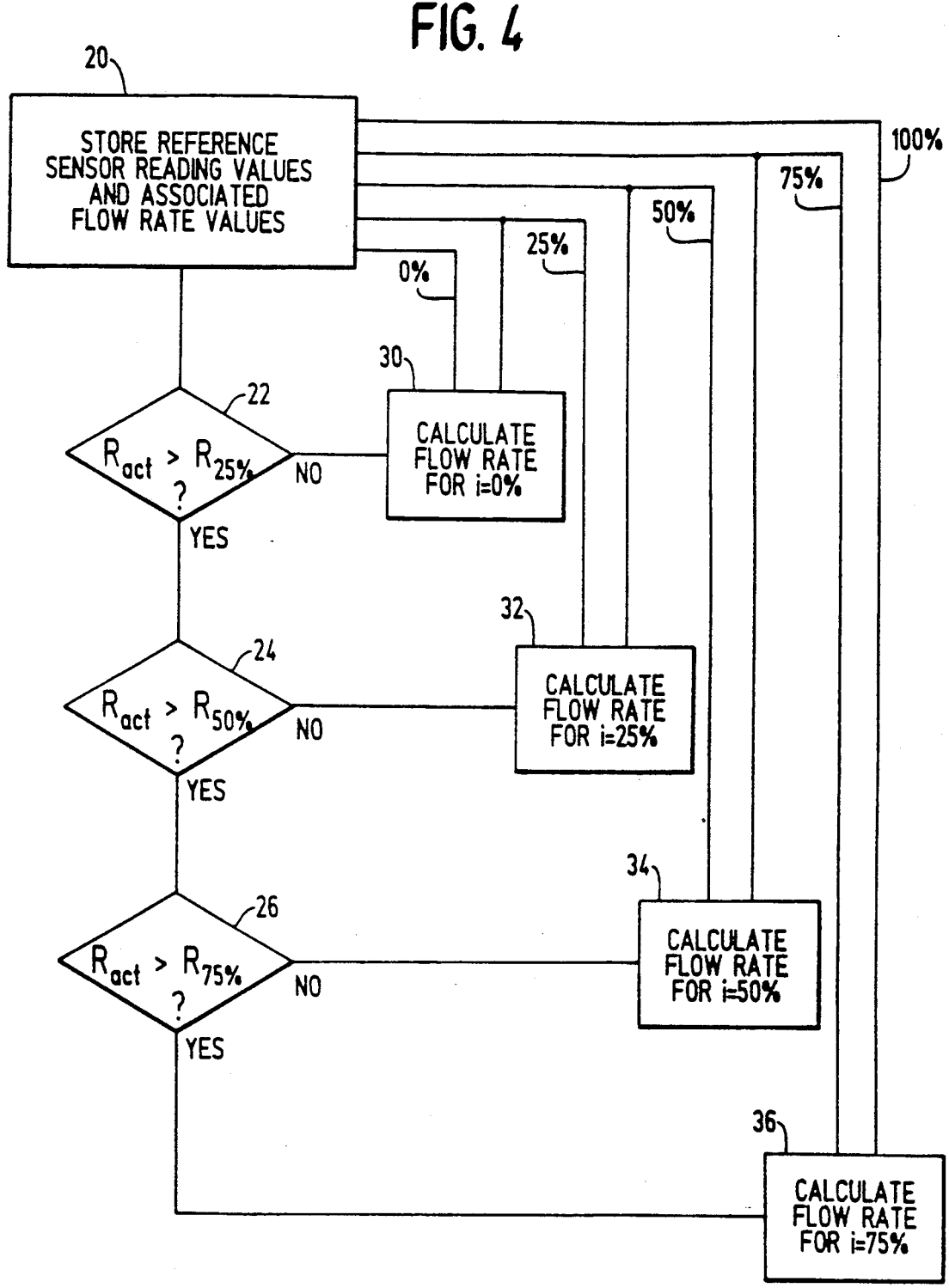
FIG. 4 is a programming flow diagram illustrating a correction operation according to the invention.

Suitable programming for the CPU is represented by the flow diagram of FIG. 4. As shown in function block, 20, reference sensor readings and associated flow rate values determined during initial calibration are stored before the instrument is placed into operation. Then, the instrument may be placed into operation and when unit 14 is turned on, the range segment in which the current sensor reading is located is determined in decision blocks 22, 24 and 26 and the appropriate flow rate calculation is performed in that one of calculation blocks 30, 32, 34 and 36 which is designated by the response of blocks 22, 24 and 26.

One advantage of the present invention is the extreme simplicity of the programming which must be installed in the CPU, particularly since calculation blocks all operate according to the same equation, with different parameter values, and a substantial improvement in measuring accuracy can be achieved with only a small number of reference sensor reading values. As a result, the amount of memory needed to store all data and programming is quite small.

In accordance with a further feature of the invention, a single instrument can be used to produce corrected readings for a plurality of different gasses, without requiring separate calibration for each gas and without requiring a significant increase in the amount of memory required. Preferably, this is achieved by deriving sensor signal proportional values for a reference gas for which calibration values are generated in the manner described above, and sensor signal proportional values for other gasses whose flow is to be measured, producing modified sensor reading reference values for the gas to be measured, and using those modified reference values to produce corrected sensor readings in the manner described earlier herein.

Derivation of the modified reference values is based on the following proportionality relationship which relates sensor readings to gas type.

Modeled Reading $\propto$

-continued $$(K_o mPCp)\left(e^{-\frac{K_1}{m}} - 2e^{-\frac{K_1}{2m}} + 1\right)(1 + K_2 mP)$$

where:
$K_o$ is a constant dependent on the power to the sensor, and the heat transfer properties and geometry of the sensor, and substantially independent of gas type.

$K_1$ is a constant related to the sensor's nonlinearity. It is dependent on the properties of the gas flowing through the sensor and the geometry and thermal properties of the sensor in accordance with the following relationship, $$K_1 = \frac{\frac{2\, UA_o}{PCp}}{1 + \frac{UA_o}{hA_i}}$$

where:
$UA_o$—is the heat conductance from the sensor to the medium surrounding the sensor,
U—is the effective conductivity of the medium surrounding the sensor,
$A_o$—is the effective area of contact with the medium surrounding the sensor,
$hA_i$—is the heat conductance from the sensor to the gas flowing through the sensor and is related to the thermal conductivity of the gas.
h—is the effective conductivity of the gas flowing through the sensor,
$A_i$—is the effective area of contact with the gas flowing through the sensor,
P—is the gas density at standard temperature and pressure,
Cp—is the specific heat of the gas.
$K_2$—is a constant related to the nonlinearity of the flow splitter associated with the sensor, and
m—Is the mass flow rate through the instrument.

It will be noted that in order to derive modeled readings for a plurality of gasses, it is only necessary to have available for each gas, including the reference gas, the respective values for P, Cp and h.

In practice the nonlinearity constants of the sensor and flow splitter are empirically determined on a reference gas such as nitrogen. The instrument is then :: calibrated on the reference gas and reference flow points as described in the previous algorithm are read and stored. The reference flow points for different gases are determined by dividing the sensor signal calculated for the new gas at the desired flow to the sensor signal calculated for the reference gas at the same flow and multiplying this ratio by the corresponding flow point measured on the instrument during calibration on the reference gas.

One example of derivation of a modified sensor reading is the following, relating to the sensor reading a flow rate value of 25% (i=25%):

$R_i$ (New Gas) = $R_i$ (Reference Gas) ×

$$\frac{\text{Modeled Reading for New Gas @ 25\% Flow}}{\text{Modeled Reading for Reference Gas @ 25\% Flow}}$$

This process is repeated at the 50%, 75% and 100%, and if necessary 0%, flow points. The newly calculated flow points gas are substituted into the interpolation algorithm in place of those measured for the reference gas and the recalibration of the MFC for the new gas is complete.

While the description above refers to particular embodiments of the present invention, it will be understood that many modifications may be made without departing from the spirit thereof. The accompanying claims are intended to cover such modifications as would fall within the true scope and spirit of the present invention, The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of correcting measurement errors of an instrument for measuring the flow rate of a gas, the instrument having a selected measuring range and being constructed to produce an uncorrected output indicating an unknown gas flow rate in the selected measuring range, said method comprising:
    selecting a limited number of known gas flow rates which are spaced apart across the selected measuring range;
    determining reference sensor outputs produced by the instrument when the instrument is measuring the selected known gas flow rates;
    measuring an unknown gas flow rate with the instrument to produce an uncorrected output indicating the unknown gas flow rate; and
    producing a corrected reading of the unknown gas flow rate by calculating a function of the uncorrected output produced in said measuring step and two reference sensor outputs produced in said determining step.

2. A method as defined in claim 1 wherein said the two reference sensor outputs are immediately above and below, respectively, the uncorrected output produced in said measuring step, and said step of producing a corrected reading comprises combining the uncorrected output produced in said measuring step and the two reference sensor outputs produced in said determining step according to a given function.

3. A method as defined in claim 2 wherein the corrected reading is produced according to the following equation:

$$\text{Present Flow Rate} = \text{Flow Rate}_i + \left(\frac{R_{act} - R_i}{R_{i+1} - R_i} \cdot \frac{1}{n}\right),$$

where:
    the Flow Rates are in terms of percent of full scale,
    Flow Rate$_1$ is the selected flow rate associated with the reference sensor output which is lower than, and closest to, the present uncorrected output;
    $R_{act}$ is the present uncorrected output;
    $R_i$ is the reference sensor output associated with Flow Rate$_i$;
    $R_{i+1}$ is the reference sensor output immediately above $R_i$; and
    n is the number segments into which line 2 is divided by the selected flow rates.

4. A method as defined in claim 3 wherein the number of known flow rates is greater than three.

5. A method as defined in claim 4 wherein each end of the measuring range is associated with respective known flow rates.

6. A method as defined in claim 5 wherein the number of known selected flow rates is not greater than ten.

7. A method as defined in claim 4 wherein the number of known selected flow rates is not greater than ten.

8. A method as defined in claim 7 wherein each end of the measuring range is associated with respective known flow rates.

9. A method as defined in claim 1 for measuring the flow of a selected one of a plurality of different gasses, one of which is a reference gas, wherein:
the sensor responds differently to each gas;
said step of determining comprises determining the reference sensor outputs produced by the instrument when the instrument is measuring flows of the reference gas at the selected known flow rates, and calculating modified values for those reference sensor outputs for one of the gasses other than the reference gas;
said step of measuring is performed on the one gas other than the reference gas; and
the function employed in said step of producing a corrected reading includes the modified values produced in said step of determining.

* * * * *